Aug. 17, 1943.  H. N. DEANE ET AL  2,326,765
TAPE TIME RECORDER WITH DIFFERENTIATED RECORDS
Original Filed May 20, 1941   5 Sheets-Sheet 1

Inventors
Henry N. Deane
James A. Dell
Atty.

Aug. 17, 1943.   H. N. DEANE ET AL   2,326,765
TAPE TIME RECORDER WITH DIFFERENTIATED RECORDS
Original Filed May 20, 1941   5 Sheets-Sheet 2
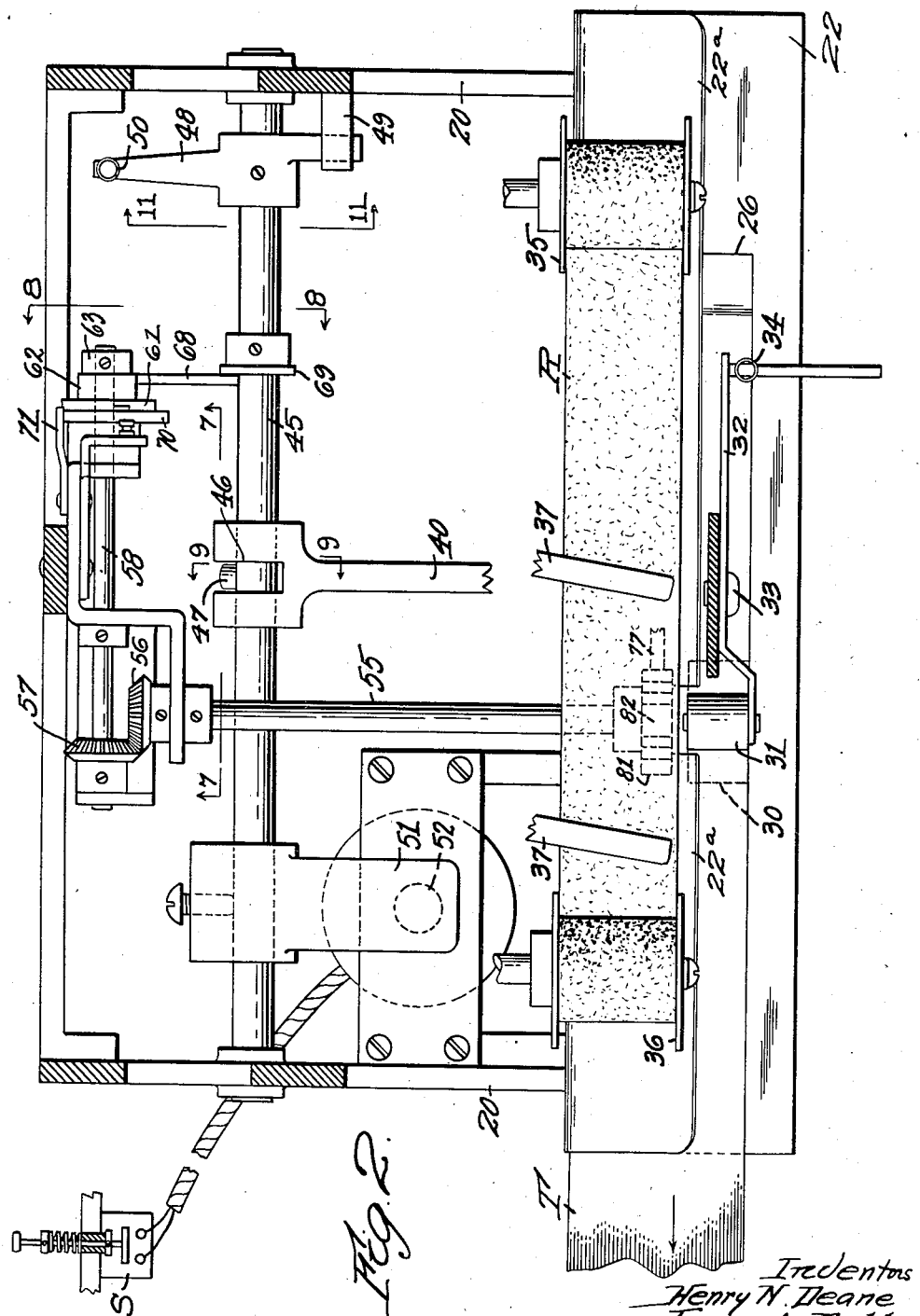
Inventors
Henry N. Deane
James A. Dell
Atty.

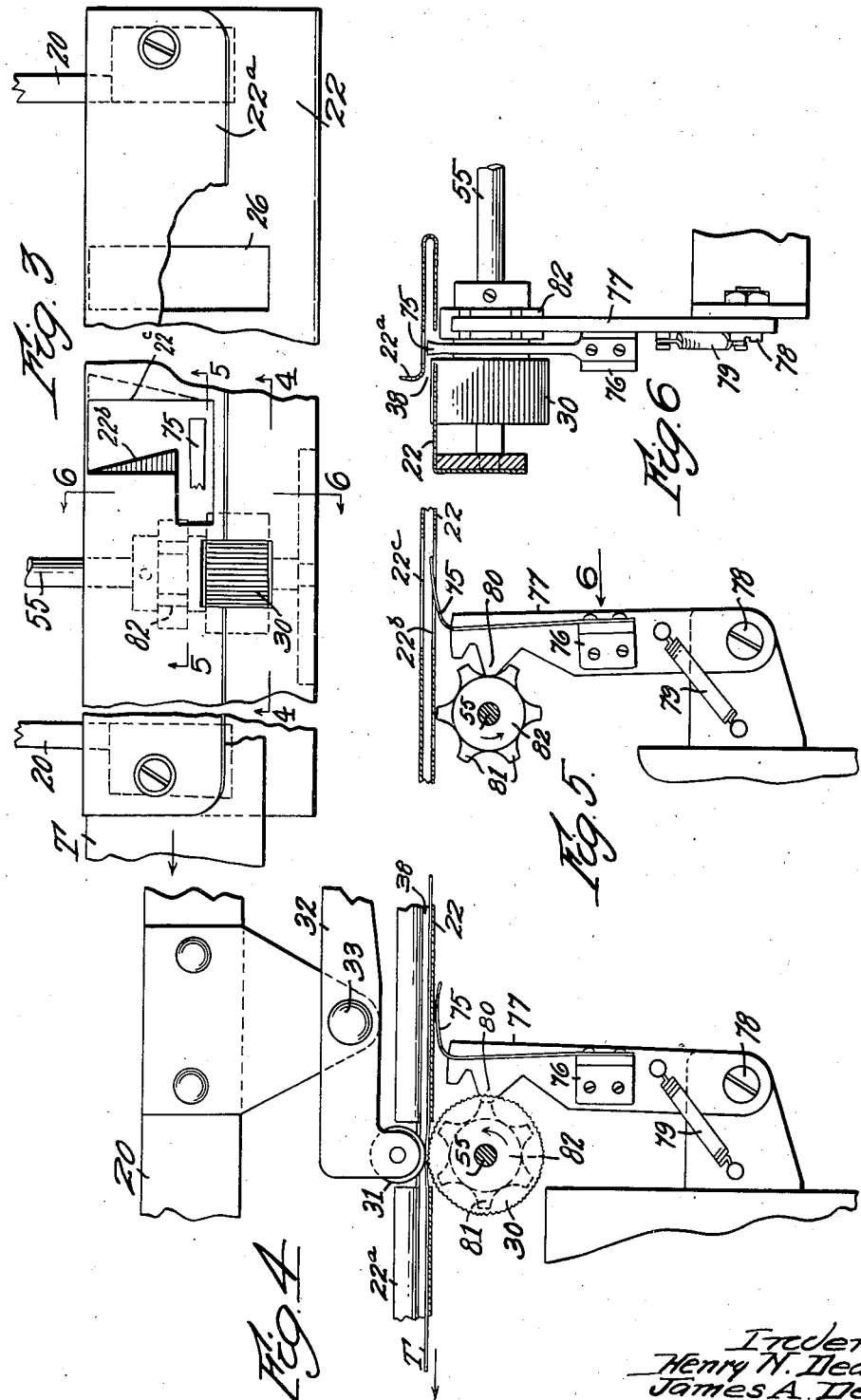

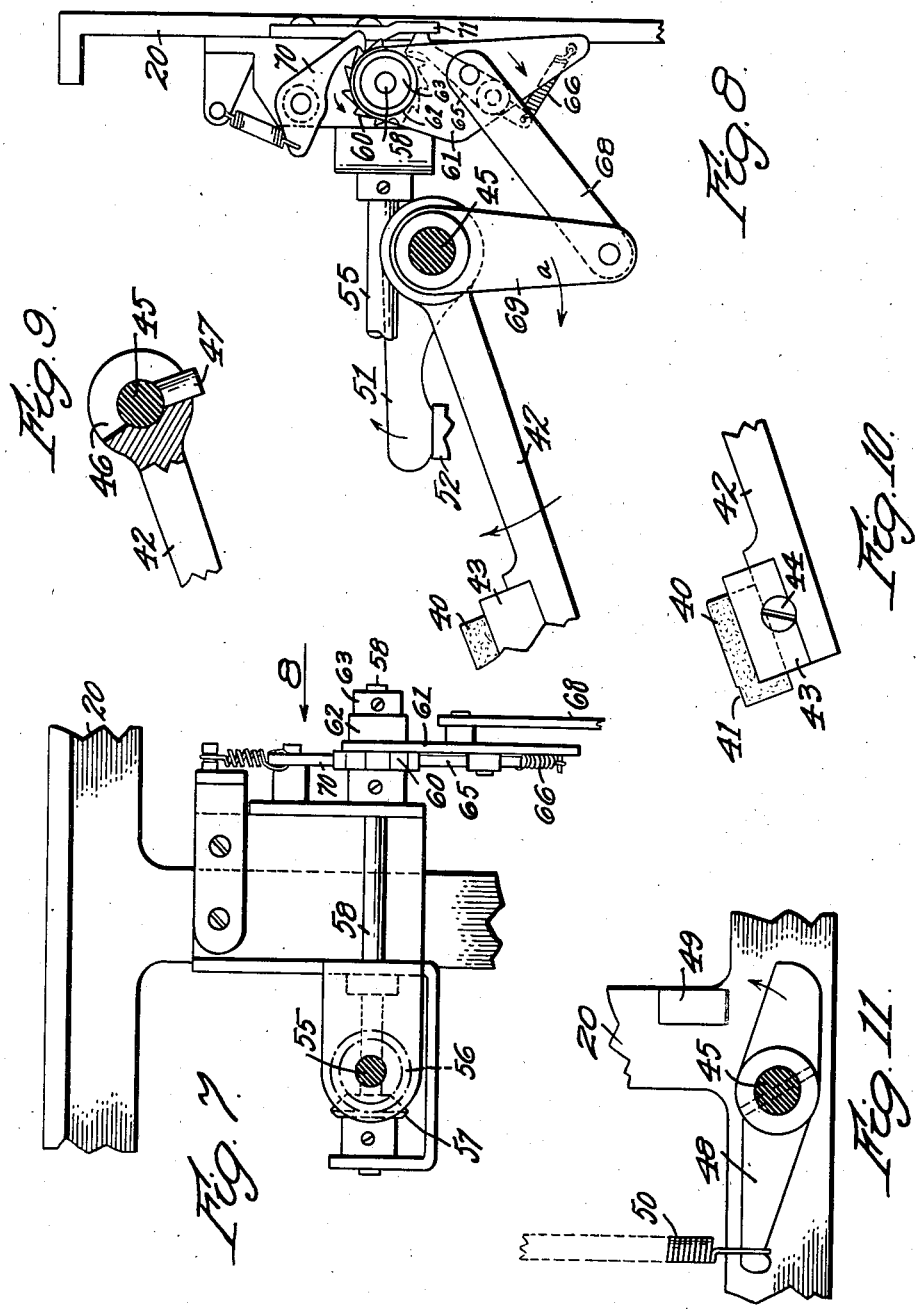

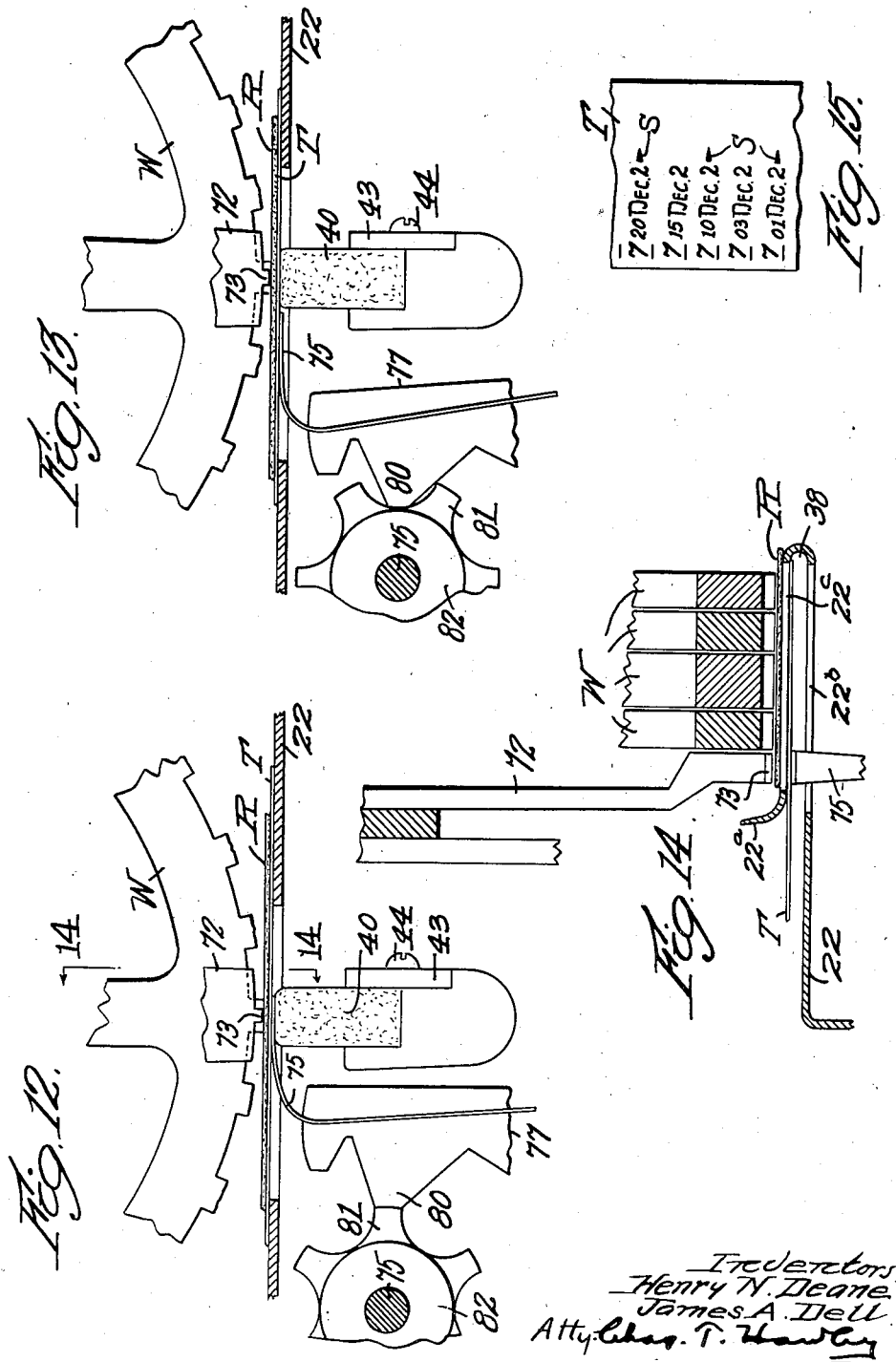

Patented Aug. 17, 1943

2,326,765

UNITED STATES PATENT OFFICE 2,326,765

TAPE TIME RECORDER WITH DIFFERENTIATED RECORDS

Henry N. Deane and James A. Dell, Gardner, Mass., assignors to Simplex Time Recorder Co., Gardner, Mass., a corporation of Massachusetts Original application May 20, 1941, Serial No. 394,380. Divided and this application December 8, 1941, Serial No. 422,041

2 Claims. (Cl. 101—96)

This application relates to a machine to be used in the making of time records on a continuous record surface, such as a paper tape, and is a division of our prior application, Serial No. 394,-380, filed May 20, 1941.

An important object of the invention relates to the provision of means for differentiating certain records, which means in the preferred form comprises a device to impress an auxiliary symbol on the record, and automatic means to render said device alternately operative and inoperative.

Our invention further relates to arrangements and combinations of parts which will be hereinafter described and more particularly pointed out in the appended claims.

A preferred form of the invention is shown in the drawings, in which

Fig. 2 is a sectional plan view, taken along the line 2—2 in Fig. 1;

Fig. 3 is a partial plan view of certain parts, looking in the direction of the arrow 3 in Fig. 1;

Figure 1:
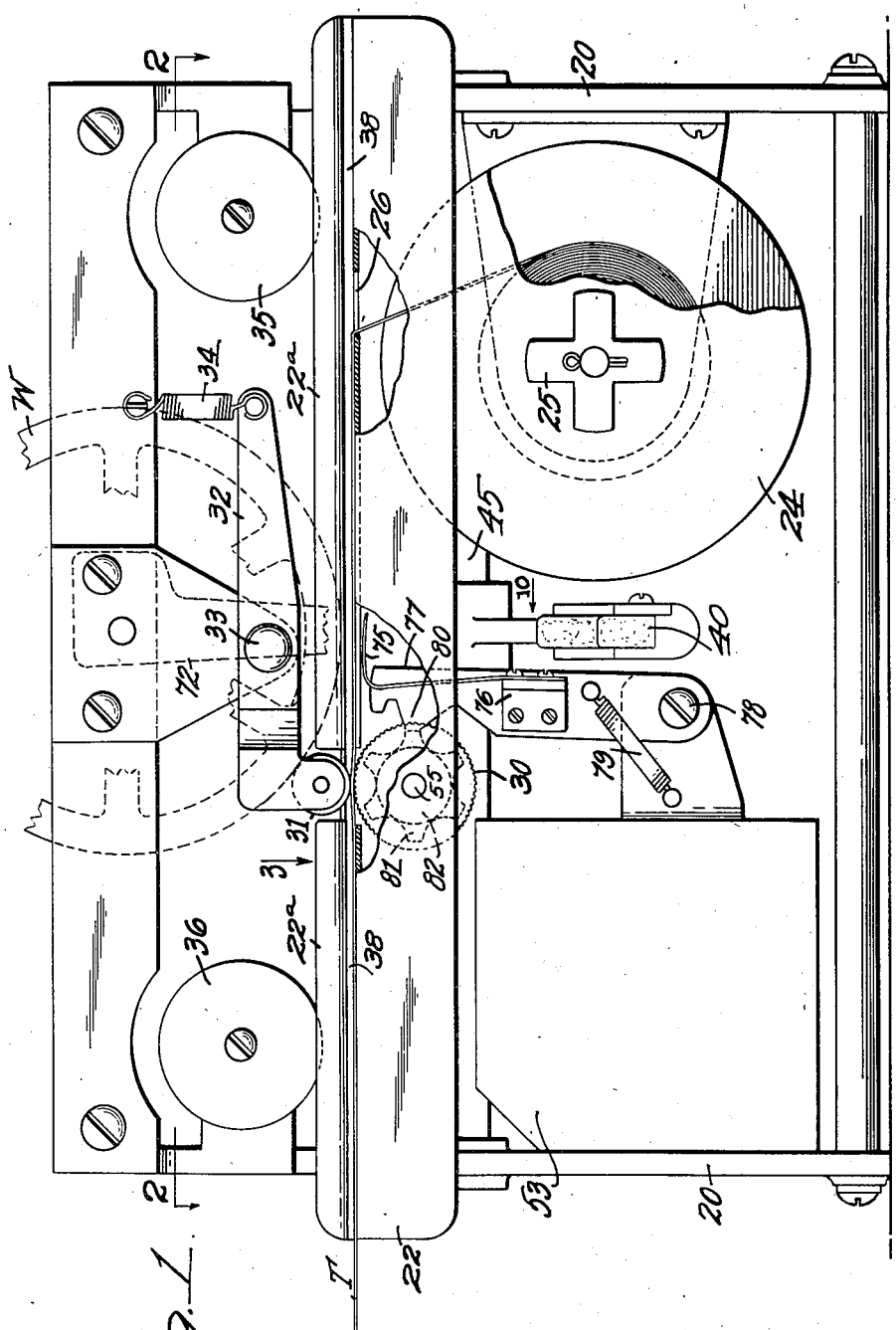
Fig. 1 is a front elevation of our improved time stamp.

Figs. 4 and 5 are partial sectional front elevations, taken along the lines 4—4 and 5—5 in Fig. 3 respectively;

Fig. 6 is a partial sectional side elevation, taken along the line 6—6 in Fig. 3 and looking in the direction of the arrow 6 in Fig. 5;

Fig. 7 is a partial sectional front elevation of certain feeding mechanism, taken along the line 7—7 in Fig. 2;

Fig. 8 is a side elevation of the feeding mechanism, looking in the direction of the arrow 8 in Fig. 7;

Fig. 9 is a detail sectional view, taken along the line 9—9 in Fig. 2;

Fig. 10 is a partial side elevation of the impression hammer, looking in the direction of the arrow 10 in Fig. 1;

Fig. 11 is a detail sectional side elevation, taken along the line 11—11 in Fig. 2;

Fig. 12 is an enlarged front elevation of the impression devices and associated parts, partly in section;

Fig. 13 is a view similar to Fig. 12 but with certain parts in a different relation;

Fig. 14 is a partial sectional elevation, taken along the line 14—14 in Fig. 12; and Fig. 15 is a plan view of a portion of a tape record.

Referring to the drawings, we have shown portions of a time stamp comprising a frame 20 on which a plurality of type wheels W (Fig. 1) are mounted for rotation by any usual driving mechanism, such as an electric motor not shown.

A support 22 is provided at the front of the machine to support a paper tape T which is supplied from a feed roll 24. The roll 24 is rotatably supported in the lower front part of the machine as shown in Fig. 1 and is frictionally retarded by a spring washer 25.

The tape T is drawn up from the roll 24 through a slot 26 in the support 22, and passes to the left in Fig. 1 under the type wheels W and type ribbon R (Figs. 2 and 14) and between a corrugated feed roll 30 (Fig. 1) and a pressor roll 31. The roll 31 is mounted on a lever 32 pivoted at 33 and yieldingly actuated by a spring 34.

The type ribbon R is mounted on the usual ribbon rolls 35 and 36 and any usual automatic ribbon feed may be provided for intermittently advancing and reversing the ribbon. Parts of a feed reverse mechanism are shown at 37 (Fig. 2).

A portion 22ᵃ (Fig. 14) of the tape support 22 is bent upwardly and forwardly to form a guide slot 38 for the tape T and to separate the tape T and ribbon R, except at the impression point where the support 22 and its upper portion 22ᵃ are both recessed as shown at 22ᵇ and 22ᶜ in Fig. 14 to permit the hammer 40 to engage the tape T and force the tape, together with the ribbon, upwardly against the type wheels.

The hammer 40 (Fig. 10) consists of a block of rubber recessed at 41 for a purpose to be described, and secured to the outer end of a hammer lever 42 by a clamping plate 43 and screw 44.

The lever 42 is loosely pivoted on a hammer shaft 45 (Fig. 2) and is provided with a segmental slot or recess 46 (Fig. 9) which receives a stud 47 fixed in the shaft 45. This loose connection of the hammer lever with the shaft 45 permits the hammer to be positively operated for a stamping stroke by the stud 47, and also prevents rebound of the hammer from interfering with the feed of the tape on the return movement of the shaft 45, as will be hereinafter described.

A lever 48 (Fig. 11) is fixed to the shaft 45 and engages a stop 49 at the end of the stamping movement of the shaft. A spring 50 secured to the rear end of the lever 48 returns the parts to normal position and supplies power for the paper feed.

The shaft 45 is actuated for an impression stroke by a lever 51 (Fig. 8) which is actuated by a plunger 52 forming part of a solenoid-operated stamping mechanism mounted within a casing 53 (Fig. 1), the details thereof forming no part of our present invention. Mechanism suitable for such purposes is disclosed in the prior patent to Watkins, No. 2,102,771. The solenoid circuit includes a control switch S (Fig. 2) which may be quite remote from the recorder.

For the purpose of intermittently advancing the paper tape after each stamping operation, we mount the feed roll 30 on a horizontal shaft 55 (Fig. 2) supported in fixed bearings and extending rearward. The shaft is provided at its rear end with a bevel gear 56 (Fig. 2) engaging a bevel gear 57 on a tape feed shaft 58. The shaft 58 is rotatable in fixed bearings and has a ratchet 60 (Fig. 7) mounted near the end thereof remote from the bevel gear 57.

A feed lever 61 has its hub 62 loosely mounted on the end portion of the shaft 58 and held from displacement by a collar 63. A feed pawl 65 (Figs. 7 and 8) is mounted on the lever 61 and is yieldingly pressed against the ratchet 60 by a spring 66.

A link 68 connects the lever 61 to an arm 69 fixed on the hammer shaft 45. As the shaft 45 is moved clockwise as indicated by the arrow $a$ in Fig. 8 for a stamping stroke, the feed lever 61 is withdrawn and the latch 65 engages a fresh tooth of the ratchet 60. On the return stroke of the shaft 45 under the tension of the spring 50, the latch 65 engages the ratchet and advances the shafts 58 and 55 and the corrugated feed roll 30 for a tape feeding movement.

A yieldingly mounted holding pawl 70 (Fig. 8) prevents reverse movement of the ratchet 60 as the latch 65 is moved rearward. At the end of its feeding stroke the latch 65 engages a stop 71 (Fig. 8), thus preventing overfeed and also limiting the anticlockwise movement of the shaft 45.

The machine herein shown is particularly intended for making a record of the repeated occurrence of certain events, such as the starting or stopping of a machine or the opening or closing of a door, and it is desirable to provide some means for easily identifying all of the records which have the same significance.

We accomplish this result by impressing a special symbol alongside each alternate time record, and we have provided special mechanism for alternately printing and omitting this symbol on the printed record. A sample of the tape record is shown in Fig. 15, with the special symbol S appearing alongside each alternate time and date record.

For impressing such a symbol, we provide a fixed bar 72 (Figs. 1, 12 and 14) having a projection 73 at its lower end positioned alongside the type wheels W and above an edge portion of the ribbon R. The projection 73 presents the symbol S but overlies the recessed end portion 41 of the hammer 40 and the symbol will not be impressed upon the record unless a yieldable member 75 (Fig. 12) is interposed between the hammer 40 and the ribbon R.

This member 75 preferably comprises a long narrow strip of flexible copper or other metal, with its lower end fixed to a bracket 76 (Fig. 5), which in turn is mounted on a lever 77 having a fixed pivot 78 and yieldingly moved to the left in Fig. 5 by a tension spring 79.

The lever 77 has a cam projection 80 adapted to engage the teeth 81 of a star wheel 82 (Figs. 5, 12 and 13). The star wheel is fixed to the feed roll shaft 55 and is intermittently advanced with the feed roll by the ratchet feeding mechanism previously described.

The amount of feed is so adjusted that every second feeding operation will bring one of the teeth 81 under the cam projection 80 and thus advance the member 75 to the operative position shown in Fig. 12, in which position the flexible end of the member 75 projects into the recess 41 and transmits the hammer blow through the tape T and ribbon R to the projection 73, thus impressing the symbol S on the record.

After an impression has been thus made, the next feeding action advances the star wheel 82 to the inoperative position shown in Fig. 13, in which position the projection 80 is received in the recess between adjacent teeth 81, and the strip 75 is withdrawn from operative position. When the hammer is operated with the strip 75 withdrawn, no symbol S is imprinted on the record.

We have thus provided a time recorder which will print successive records on a continuous tape and which will automatically advance the tape after each record has been printed. We have also provided a time recorder by which alternate records may be quickly and easily identified. For illustration, all of the records indicating starting of a machine may be readily distinguished from records indicating the stopping of the machine.

Furthermore, the electrical control of the impression mechanism by simply closing the solenoid circuit makes it possible to control the machine by the switch S at any desired or remote point, so that the time recorder is not necessarily adjacent the machine or other device of which the operation is to be recorded.

Having thus described our invention and the advantages thereof, we do not wish to be limited to the details herein disclosed, otherwise than as set forth in the claims, but what we claim is:

1. In a recording mechanism having a record sheet, printing devices and means to make an impression therefrom on said record sheet, in combination, a supplemental impression device mounted adjacent said printing devices, a pressure-transmitting element insertable between a portion of said impressing means and said supplemental impression device and rendering said means effective to make an impression from said supplemental device, and automatic means to alternately insert and withdraw said insertable element.

2. In a recording mechanism having a record sheet, printing devices and means to make an impression therefrom on said record sheet, in combination, a supplemental impression device mounted adjacent said printing devices, a pressure-transmitting element insertable between a portion of said impressing means and said supplemental impression device and rendering said means effective to make an impression from said supplemental device, automatic means to feed said record sheet after each impression thereon, and a cam associated with said feeding means and effective to alternately insert and withdraw said insertable element on successive operations of said feeding means.

HENRY N. DEANE.
JAMES A. DELL.